UNITED STATES PATENT OFFICE.

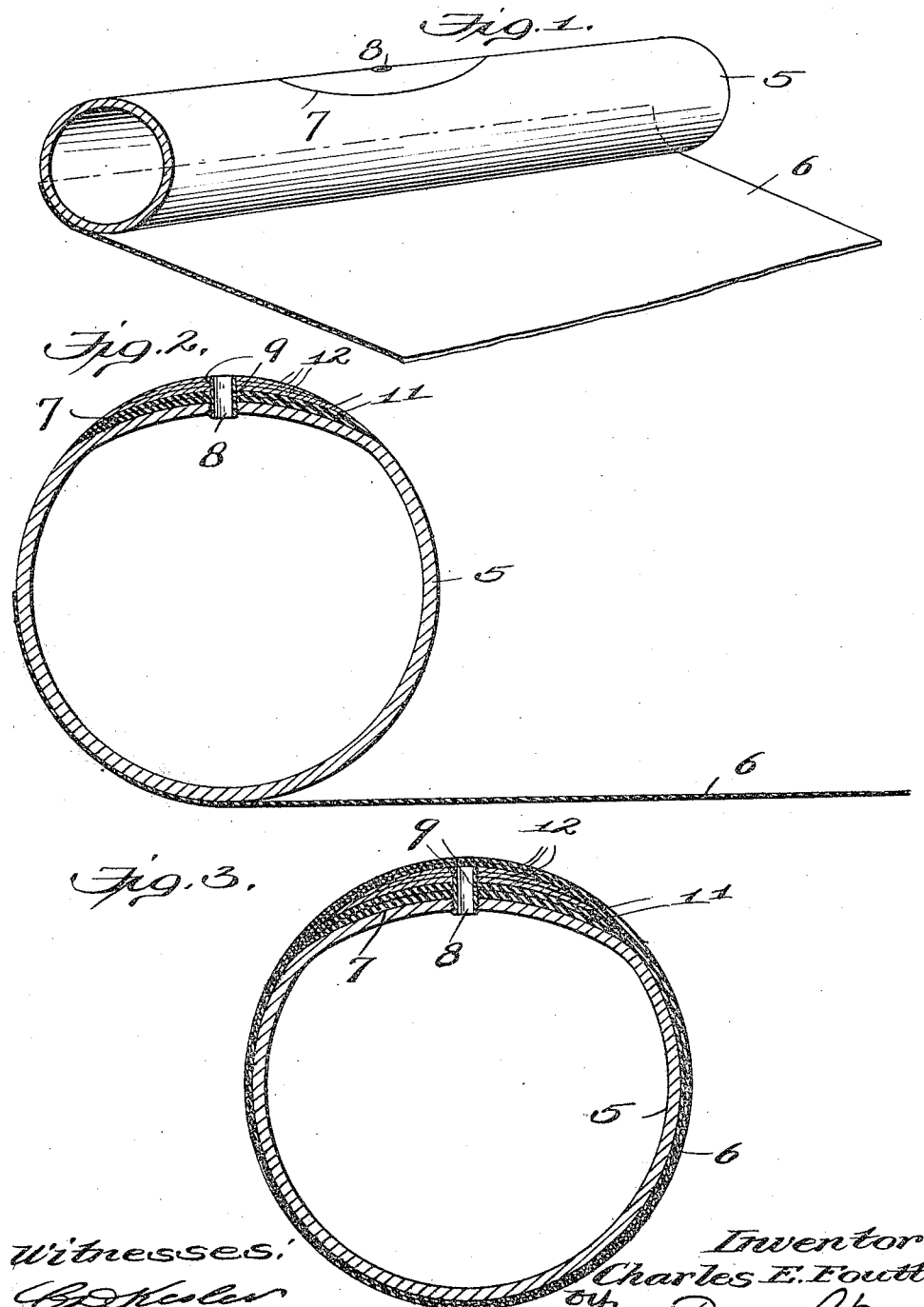

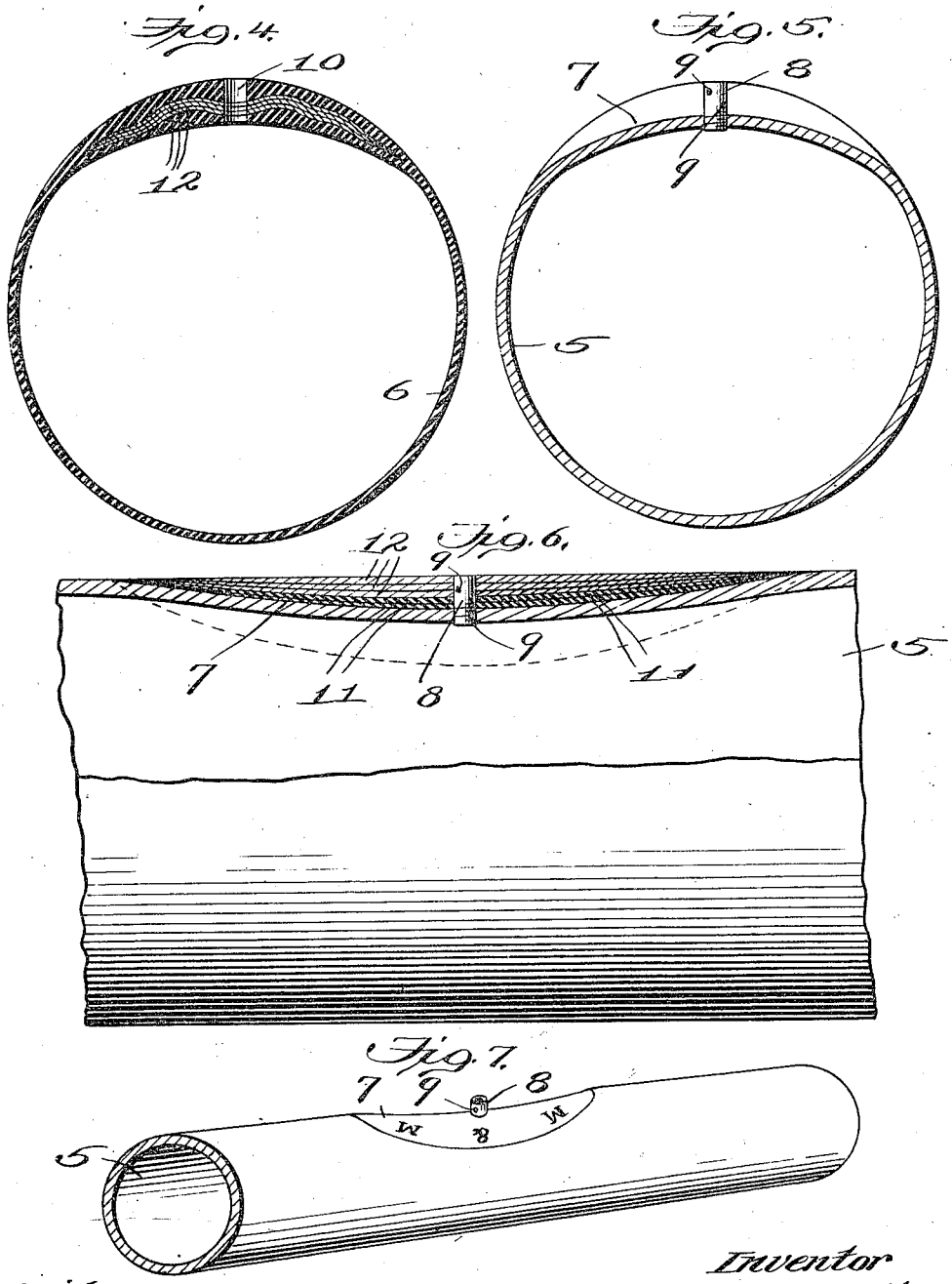

CHARLES E. FOUTTS, OF EAST LIVERPOOL, OHIO.

MANDREL FOR MAKING INNER TUBES FOR TIRES.

1,173,944.  Specification of Letters Patent.  Patented Feb. 29, 1916.

Application filed April 26, 1915. Serial No. 24,121.

*To all whom it may concern:*

Be it known that I, CHARLES E. FOUTTS, a citizen of the United States, residing at East Liverpool, in the county of Columbiana and State of Ohio, have invented new and useful Improvements in Mandrels for Making Inner Tubes for Tires, of which the following is a specification.

This invention relates to mandrels for forming the inner tubes of inflatable tires and particularly to structural means embodied in the mandrel for facilitating the application of a valve patch on the inner tube. At present the usual practice is to make a separate patch and cement it to the tube after the latter is vulcanized, or to place the cement patch on the mandrel or pipe on which the tube is formed and roll the tube on the patch. The disadvantages incident to a cement patch are manifold, and among others may be mentioned that such patch does not become a positively fixed part of the tube and is liable to loosen and in part, at least, separate from the tube and establish leakage around the valve, and, further, the finish under the most favorable circumstances is crude and unsatisfactory. Moreover, when a patch is applied with cement and placed next to the mandrel or pipe and rolled onto the tube there is always a tendency to trap air between the patch and tube and the patch frequently shifts, and as a consequence a large percentage of defective tubes is produced with considerable loss in the manufacture of commercially satisfactory inner tubes.

One object of the present invention is to overcome the disadvantages incident to the use of a valve patch cemented to the inner tube by providing the mandrel or pipe with a patch seat or depression of any suitable form and of such dimensions as to receive the patch organization as a whole and in flush position relatively to the cylindrical surface of the mandrel and roll the patch thus held by the mandrel onto the tube and secure the patch to the tube at the time the latter is vulcanized, thereby effecting a practically homogeneous relationship between the patch and the part of the tube to which it is applied without the use of cement or other adhesive means.

A further object of the present inventior is to provide means embodied in the struc-
ture of the mandrel or the tubular element
utilized in forming the inner tube of an inflatable tire for receiving a patch in a crude or incomplete state and rolling such patch onto the tube and securing the same by vulcanization in proper position on the tube and to eliminate all possibility of trapping air between any part of the patch and the tube.

A still further object of the invention is to provide a tube forming mandrel with patch holding means whereby a valve patch may be rolled onto and become a practically homogeneous part of the tube by vulcanization of the latter and also to provide the mandrel with means for forming the valve opening in the patch and portion of the tube adjacent to the patch without requiring an after puncture and mutilation of the tube and patch for the application of the valve to the tube.

With these and other objects and advantages in view the invention consists in the preferred construction and arrangement of inner tube forming means or mandrel which will be more fully hereinafter described and claimed and subject to such variations as fairly fall within the scope of the claims.

In the drawings: Figure 1 is a perspective view of a part of a mandrel or tube forming means embodying the features of the invention, a valve patch being shown in place on the mandrel prior to application to the rubber sheet and the latter partially applied around the mandrel. Fig. 2 is an enlarged transverse vertical section through the center of the mandrel as shown by Fig. 1 and illustrating the rubber tube forming sheet in longitudinal section and in the same position as shown by Fig. 1. Fig. 3 is an enlarged transverse vertical section similar to Fig. 2 with the rubber tube forming sheet completely wound about the mandrel and over the patch, the position of the parts in this figure being that prior to vulcanization. Fig. 4 is a transverse vertical section through a completed tube and patch subsequent to vulcanization and particularly showing the practical homogeneity of the patch relatively to the tube. Fig. 5 is a transverse vertical section through the center of the mandrel and illustrating the patch and tube removed therefrom. Fig. 6 is a longitudinal vertical section through the center of a portion of the mandrel showing the patch in position in the seat or depression therefor. Fig. 7 is a detail perspective view of a portion of the improved mandrel or tube forming means.

The numeral 5 designates a mandrel or pipe or the cylindrical means that is usually employed for forming the inner tubes of inflatable tires, and said member or pipe 5 may be operated manually or be included in the organization of a machine equipped with means for mechanically rotating the said mandrel. In ordinary inner tube constructions the edge portion of the rubber which is first applied to the mandrel is wiped with gasolene, and the mandrel is then laid straight on the wiped portion of the sheet and rolled over said sheet to effect a close adherence of the sheet relatively to the mandrel as the latter is rolled onto the sheet. As will be understood, the sheet 6 is usually of crude rubber or unvulcanized and ordinarily two windings of the sheet on the mandrel are made to give the inner tube the proper thickness, as clearly illustrated by Fig. 3. After the crude or unvulcanized sheet 6 is thus wound on the mandrel it is then vulcanized and the convolutions of the sheet become homogeneous and at a proper time the tube as thus produced is removed from the mandrel. As heretofore indicated, it has been customary in applying valve patches to a tube to cement said patches in place, but by the use of the improved mandrel or pipe 5 it is unnecessary to secure a valve patch to the tube by cement as the patch may be placed in proper position relatively to the tube and secured thereto at the time the tube is vulcanized and thus become practically homogeneous with the tube, as shown by Fig. 4. The particular features of invention reside in forming the mandrel or pipe 5 with a depression or seat 7 which may be of any contour, and the said depression is of such depth as to wholly receive the components of the patch and have the outer surface of said patch flush with the cylindrical surface of the mandrel or pipe 5 adjacent to the depression. In the center of the depression 7 a tubular plug 8 is secured and is provided with one or more vent openings 9 whereby the air between the first layer of the patch and the base of the depression 7 may be liberated or caused to escape through the plug 8 into the mandrel, and, moreover, any air that may have a tendency to trap between the convolutions of the tube may also be vented into the mandrel. The plug 8 also provides for the formation of the valve opening 10 through the patch and adjacent portion of the tube, as shown by Fig. 4, and obviates necessity of the formation of said valve opening subsequent to the vulcanization of the tube and the patch.

The patch is composed of two layers 11 of rubber and three layers 12 of fabric, the outermost layer of fabric being flush with the cylindrical surface of the mandrel, or pipe 5. When the convolutions of the rubber sheet 6 are completed on the mandrel there will be two layers of rubber over the fabric layers 12. Hence, when the tube is completed as shown by Fig. 4 the fabric layers 12 will be interposed between the thickened portion of the tube around the valve opening 10 and serve as a strong reinforce, and, furthermore, the increased thickness of the rubber around the valve opening will also materially strengthen the tube at this point. When the tube with the valve patch applied by the mandrel as just explained is vulcanized, the edges of the patch will become an integral part of the tube, and hence there is no liability of loosening of any part of the patch, and, moreover, the patch is always maintained in proper position relatively to the part of the tube to which it is to be applied.

The form and dimensions of the patch may be varied at will, and while the components of the patch as hereinbefore specified are preferred, it will be understood also that they may be modified as may be desired and found necessary.

It is customary for manufacturers to form in the tube, and particularly on the valve patch, their firm name or initials to indicate the makers of the tube, and for this purpose the base of the depression 7 will have any suitable letters or other characters provided therein so that the patch will show a reproduction of such letters when the tube is completed.

What is claimed is:

1. A mandrel for forming inner tubes for tires having a valve patch receiving depression therein.

2. A mandrel for forming inner tubes for tires having a valve patch receiving depression therein of such depth as to bring the outer surface of the patch applied thereto flush with the surface of the mandrel adjacent to said depression.

3. A mandrel for forming inner tubes for tires having a valve patch receiving depression therein, and a valve opening forming means projecting outwardly from the base of said depression.

4. A mandrel for forming inner tubes for tires having a valve patch receiving depression therein, and a valve opening forming plug projecting outwardly from the center of said depression.

5. A mandrel for forming inner tubes of tires having a valve receiving patch therein, and a tubular plug projecting outwardly from the center of said depression.

6. A mandrel for forming inner tubes of tires having a valve patch receiving depression therein, and a tubular plug projecting outwardly from the base of said depression and provided with air vent means.

7. A mandrel for forming inner tubes of tires having means for retaining a valve patch in association therewith and flush with the outer surface thereof.

In testimony whereof I have hereunto set my hand in presence of two subscribing witnesses.

CHARLES E. FOUTTS.

Witnesses:
   CHAS. S. HYER,
   SADIE STANFORD WHITE.